United States Patent [19]

Yabu et al.

[11] 4,225,889
[45] Sep. 30, 1980

[54] MAGNETIC RECORDING AND REPRODUCING APPARATUS HAVING MEANS FOR RECORDING A CUE-SIGNAL

[75] Inventors: Toshiomi Yabu, Kyoto; Tatsuo Wada, Osaka; Kouichi Yamada, Higashiosaka; Tadashi Yoshino, Hirakata, all of Japan

[73] Assignee: Matsushita Electric Industrial Co., Ltd., Osaka, Japan

[21] Appl. No.: 964,684

[22] Filed: Nov. 29, 1978

[30] Foreign Application Priority Data

Dec. 2, 1977 [JP] Japan .................................. 52-145506

[51] Int. Cl.² ......................... G11B 5/02; G11B 27/30
[52] U.S. Cl. ........................................ 360/14; 360/85
[58] Field of Search ................. 360/14, 72.1, 85, 72.2, 360/13

[56] References Cited

U.S. PATENT DOCUMENTS

| | | | |
|---|---|---|---|
| 3,541,271 | 11/1970 | Joslow et al. | 360/72.1 |
| 3,647,951 | 3/1972 | Rose, Jr. | 360/14 |
| 3,852,814 | 12/1974 | Johnson et al. | 360/72.1 |
| 3,939,491 | 2/1976 | Shigeta | 360/14 |

Primary Examiner—James W. Moffitt
Assistant Examiner—Donald McElheny, Jr.
Attorney, Agent, or Firm—Wenderoth, Lind & Ponack

[57] ABSTRACT

A magnetic tape recording and reproducing apparatus provided with means for recording a cue-signal which serves to mark a predetermined point of a magnetic tape on which video signals are recorded by a rotary magnetic head. The cue-signal is recorded by a full erasing head by supplying thereto a cue-signal current having a frequency lower than the frequency of the erasing current. For example, the cue-signal current is generated by using the control signal for synchronizing the rotation of the rotary head with the tape movement.

6 Claims, 8 Drawing Figures

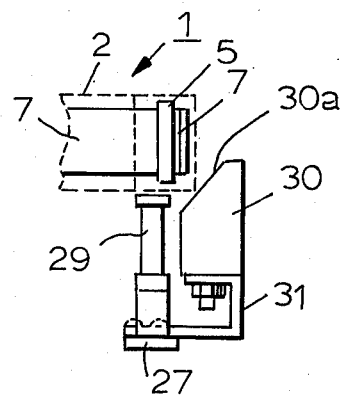
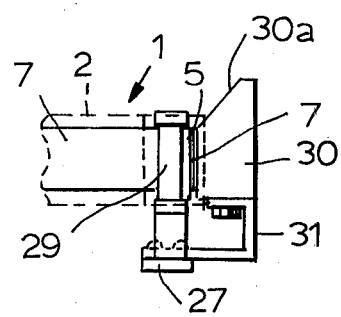
FIG.3  FIG.4
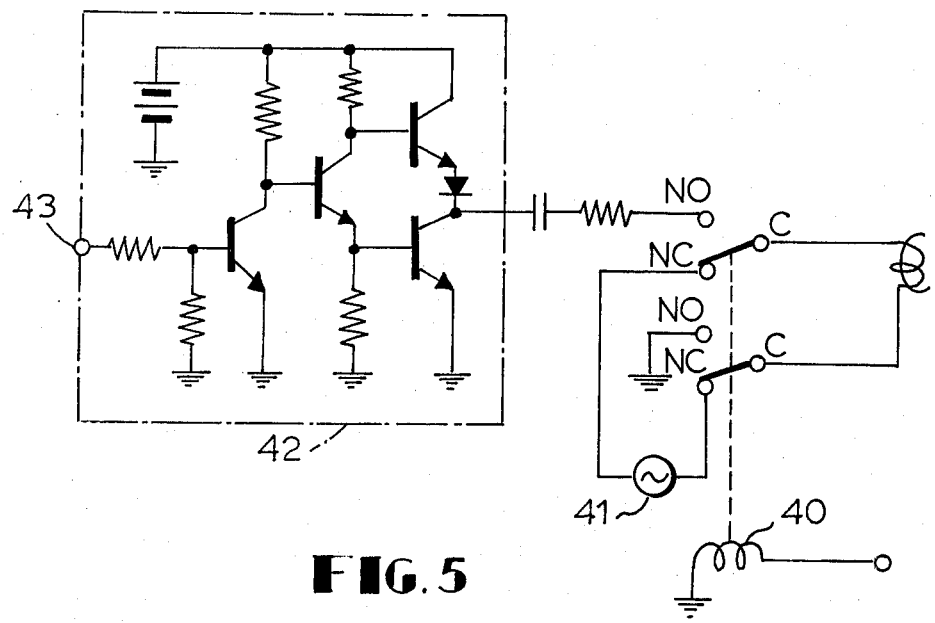
FIG.5

MAGNETIC RECORDING AND REPRODUCING APPARATUS HAVING MEANS FOR RECORDING A CUE-SIGNAL

BACKGROUND OF THE INVENTION

The present invention relates to a magnetic recording and reproducing apparatus for the recording and reproducing of the video signals (hereinafter referred to as VTR), and more particulary relates to recording of cue signals provided for the purpose of making the leading of VTR.

In the conventional VTRs for broadcasting, a cue-track was provided separately from the audio and video tracks, and the recording and reproducing of cue-signals was performed through this specialized channel. Such a device contained numerous attached circuits. In the domestic small VTRs having no cue-track, the leading for the initial recording was difficult to make; no device which afforded a handy operation was available.

SUMMARY OF THE INVENTION

It is an object of the invention to provide a simple device for recording the cue-signals of VTR, which does not require a separate channel on the magnetic tape only for recording cue-signals and does not disturb the other signals.

According to the present invention, the cue-signal is recorded on the video signal channel by an erasing head. The video signal is recorded in an overlapping state with the cue signal.

BRIEF DESCRIPTION OF THE DRAWINGS

FIGS. 1 and 2 are schematic diagrams of a helical scanning VTR according to the present invention, wherein FIG. 1 illustrates the condition where the tape cassete is set but the tape is not loaded on the rotary head cylinder and FIG. 2 the condition where the tape is loaded on the rotary head cylinder.

FIGS. 3 and 4 are side views of a portion of the apparatus as illustrated in FIGS. 1 and 2, respectively;

FIG. 5 illustrates a circuit diagram demonstrating the method of switching between the cue-signal recording circuit and the erasing head according to the present invention;

DETAILED DESCRIPTION OF THE INVENTION

Figure 1:
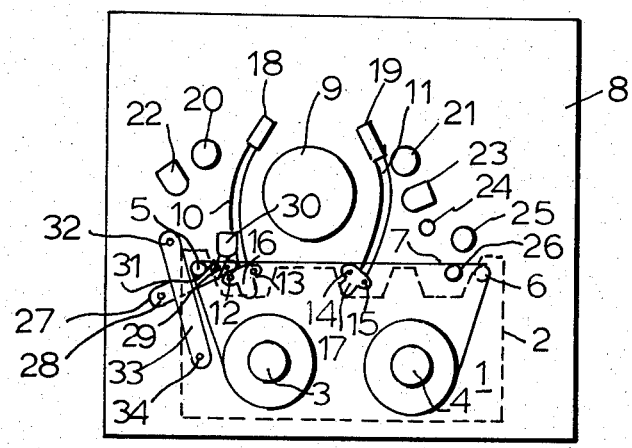
Figure 2:
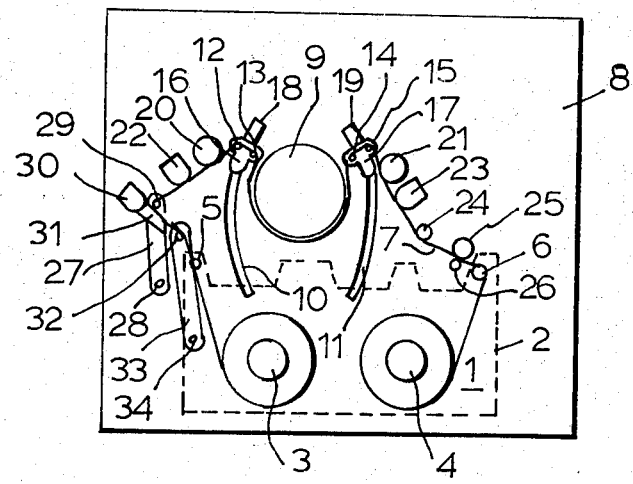

FIGS. 1 and 2 are schematic diagrams of a helical scanning VTR, an embodiment of the present invention, FIG. 1 showing the condition in which the VTR has a cassette mounted thereon, but the magnetic tape is not loaded on the rotary head, and FIG. 2 shows the conditon in which the VTR has the tape loaded respectively. Under the condition of the VTR illustrated in FIG. 1, the rapid feeding and rewinding could be performed, and under the condition illustrated in FIG. 2, the recording and reproducing could be performed.

Referring to FIGS. 1 and 2, denotes a cassette which is equipped with a case 2 (roughly shown by broken lines) opened on one side along its length. Reels 3 and 4 are placed inside the case, and the magnetic tape 7 is wound on the reels 3 and 4. Magnetic tape 7 is hung on pins 5 and 6 at both corners of the opening of the case 2, travels through the opening, but is drawn out from the opening when it is wound on the head. Reference numeral 8 stands for the main body of the VTR; 9, a head cylinder containing a rotary head; 10 and 11, guide grooves on the main body 8; and 12, 13, 14 and 15, draw-out posts, the former two are being placed on a supporting member 16, and the latter two on a supporting member 17, while the supporting members 16 and 17, respectively fit in the guide grooves 10 and 11, and are movable along the guide grooves 10 and 11. Reference numerals 18 and 19 are stoppers for holding the supporting members 16 and 17 in respective specified positions, which are firmly set on the main body 8. Reference numerals 20 and 21 represent impedance rollers, which are rotatably supported on the main body 8. Reference numeral 22 indicates a full erasing head; 23, an audio and control head, and 24, a tape post, which is fixed on the main body 8. Reference numeral 25 shows a pinchroller designed to make pressure-contact and depart from a capstan 26 by the operation of a mechanism not shown in the drawings. Reference numeral 27 refers to a rotary arm which is movable, centered on a pivot 28. Reference numeral 29 denotes a tape drawing-out post planted at the tip end of the rotary arm 27, and 30 a magnetic head for detecting the cue-signal securely held on the tip of a supporting member 31. The root of the supporting member 31 is fixed at the tip end of the rotary arm 27. When the tape is rapidly fed or rewound, with the tape 7 set in the position of FIG. 1, the cue-signal detecting head 30 is located between the pin 5 and the drawing-out post 27 to have its gap surface coming in contact with the tape 7. Reference numeral 32 designates a tension post planted on a rotary arm 33, while the rotary arm 33 is rotatably supported by a pivot 34. As shown in FIGS. 3 and 4, the cue-signal detecting head 30 has an inclined surface 30a on the side of the gap surface, which is inclined so that the distance from the post 29 increase along this upper side. Thus the tape 7 is guided by the inclined surface 30a when the cassette 1 is set in apparatus as shown in FIGS. 1 and 4.

In the following, the operation of this device is explained. When the cassette 1 set as shown in FIG. 1 with the tape not drawn out or in a state of not being loaded, the tape 7 is held in contact with the gap surface of the cue-signal detecting head 30. As the tape 7 is rapidly fed or rewound, the cue-signal detecting head 30 reads the cue-signals preliminarily recorded on the tape 7 at the positions where the recorded subjects are switched, whereupon the signal read out stops the operation of rapid feeding or rewinding through some electrical operations, thereby enabling VTR to go into the operation of reproducing the desired substance recorded. In the transition to the reproducing operation, the supporting members 16 and 17 move along the guide grooves 10 and 11 to the positions where they are stopped by the stoppers 18 and 19. Thus the drawing-out posts 12, 13, 14 and 15 draw the tape 7 out, to wind it about the head cylinder 9 in a half circle, and simultaneously, the rotary arm 27 rotates in the direction of drawing the tape 7 out by means of the drawing-out post 29, resulting in the reproducing operation state as shown in FIG. 2.

Under these conditions, the cue-signal detecting head 30 is released from the state of being in contact with the tape 7, thus having no effect on the movement of the tape during the time of reproducing and recording.

The magnetic tape 7 comes out of the feed reel 3, passes through the erasing head 22, goes around the rotary head cylinder 9 and passes the head for the audio and control signals 23, and is, then, wound up on the take-up reel 4.

The cue-signal is recorded by the erasing head 22 under the conditions as shown in FIG. 2.

FIG. 5 shows the recording circuit and the switching circuit for recording the cue-signals by the erasing head 22. The erasing head 22 is normally connected to the oscillator 41 through the contacts of the switching relay 40 at the time of recording, but at the time of recording the cue-signals, it is set to the NO contact side, causing the cue-signals to be saturated and recorded through the TTL circuit 42. The cue-signals are applied to the input terminal 43 of the TTL circuit 42.

Figure 6:
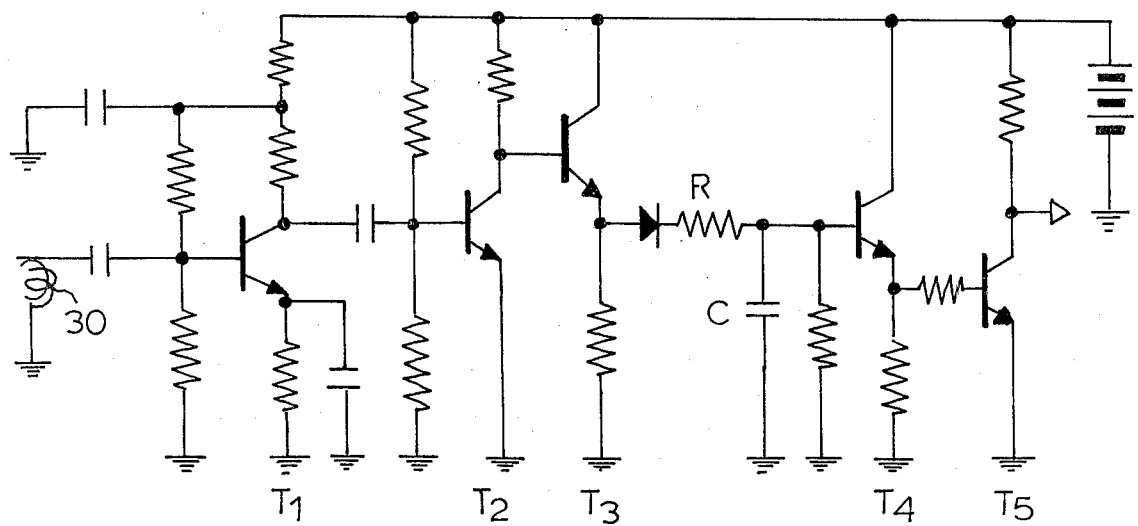
FIG. 6 illustrates a circuit diagram for detecting the cue-signal and controlling the VTR travel control section.

FIG. 6 illustrates a control circuit for stopping the VTR from the signals detected by the cue-signal detecting head 30. The circuit includes a transistor ($T_1$) on an amplifying circuit; the circuit includes another transistor ($T_2$), a pulse amplifier circuit, and the circuit includes still another transistor ($T_3$) as an impedance conversion circuit. After passing the transistors $T_1$, $T_2$ and $T_3$, the detected signals are fed to and charge a capacitor C through a resistor R. The capacitor C is coupled to a impedance conversion circuit including a transistor $T_4$. Through a switching circuit including a transistor $T_5$, the output of a transister $T_4$ is supplied to a control circuit for the tape transport.

In the VTR, in order that the rotary head cylinder 9 is turned in synchronism with the video signals to be recorded at the time of recording, the vertical synchronizing signals in the video signals are divided into two signals, a first signal to be recorded as the control signals, and on the other hand, a second signal phase compared with the rotational phase detection signals of the rotary head cylinder 9, so that the rotary head cylinder driving mechanism is controlled by means of error signals. Accordingly, the control signals and the rotational phase detection signals of the aforementioned rotary head cylinder are synchronized in phase. For this reason, the need to newly create cue-signals may be obviated by making use of the aforementioned vertical synchronizing signals or the divided control signals or the rotational phase detection signals of the rotary head cylinder, etc., as the cue-signals.

Figure 7:
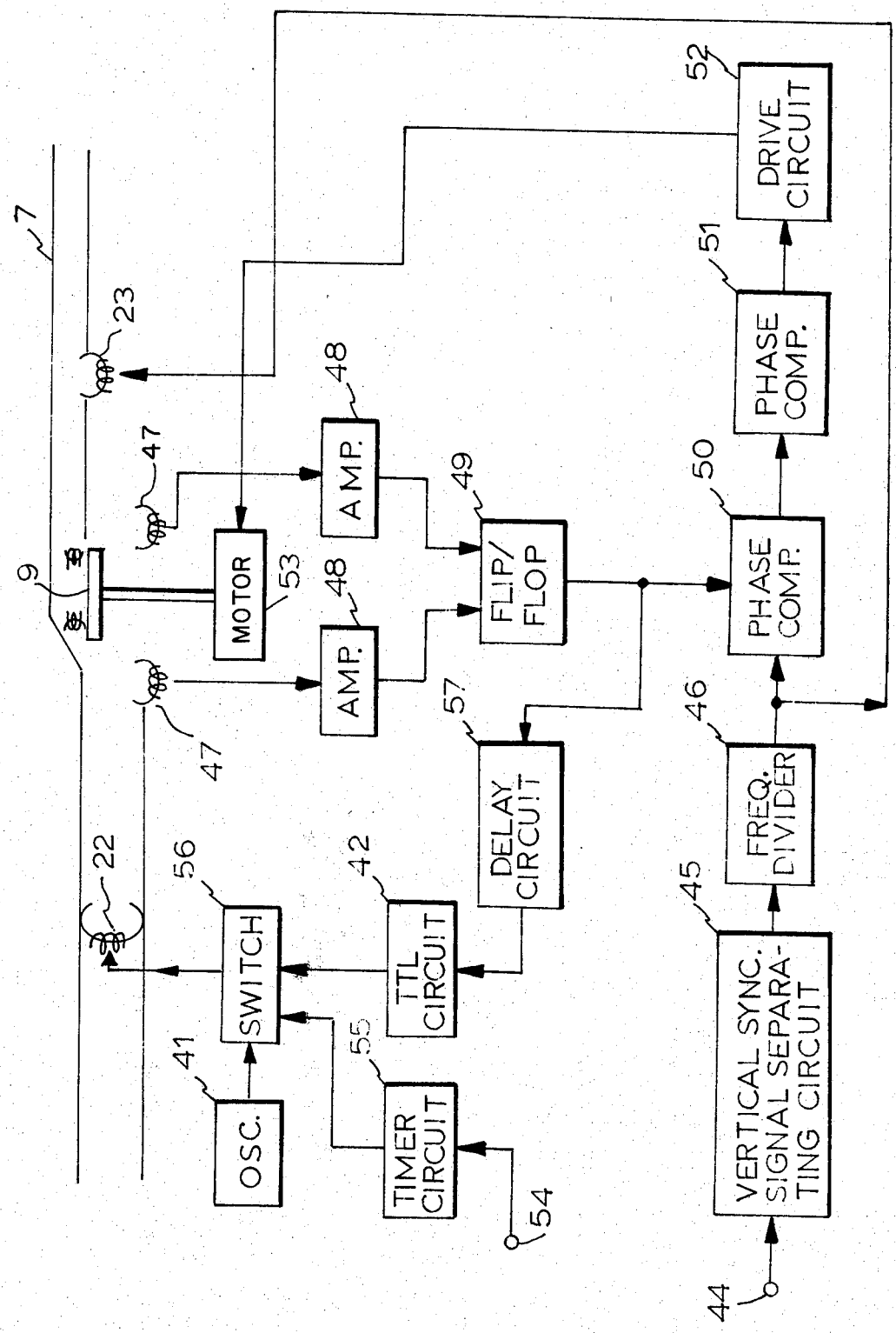
FIG. 7 illustrates a block diagram of a cue-signal recording device provided in the VTR servo section according to the present invention.

FIG. 7 is a block diagram of a cue-signal recording device having the servo-circuit and the cue-signal recording circuit coupled, which does not cause servo disturbances at the time of recording the cue-signals.

In the servo section of the VTR, as the video signals to be recorded are applied to the input terminal 44, the vertical synchronizing signals are separated by means of the vertical synchronizing signal separating circuit 45, have their frequency divided in half by the frequency divider 46, and are then fed to the control head 23 as the control signals. On the other hand, the signals detected by the rotational phase detector 47 of the rotary head cylinder 9 are amplified respectively by the PG amplifiers 48 and 48, to trigger the R/S flip-flop circuit 49, and then the output signals from the R/S flip-flop circuit 49 and the aforementioned one half divided vertical synchronizing signals are compared by means of the phase comparator 50. The output phase error signals from the phase comparator 50 are compensated in phase through the phase compensating filter 51, and amplified by the driving circuit 52, to drive the motor 53 for driving the rotary head cylinder 9. Thus, as described hereabove, a closed loop servo system is formed so that the rotational phase of the rotary head cylinder 9 may be synchronized with the phase of the vertical synchronizing signals in the video signals to be recorded.

When a cue-signal recording order signal is fed to the input terminal 54, the connection between the oscillator 41 and the erasing head 22 is cut by the switch 56 through the timer circuit 55 for a specified period of time. Then, the output signals from the R/S flip-flop circuit 49 are delayed by means of the delaying circuit 57 for a specified period of time, and recorded as the cue-signals by the erasing head 22 through the TTL circuit 42 and then the switch 56.

The reason why the output signals from the R/S flip-flop circuit 49 are delayed by means of the delaying circuit 57 is as follows: The erasing head 22 is a full erasing head i.e. it effects the erasure of the overall width of the magnetic tape, so that the cue-signal is recorded on the overall width of the magnetic tape. This means that the cue-signal exists on the control signal track. On the other hand, the control head 23 and the erasing head 22 are located at a distance from each other. Therefore in the case that the cue-signal is recorded during the reproduction of the video signals, the phase of the cue-signal is shifted from that of the control signal on the tape 7. Thus the reproduced control signal becomes irregular due to interposition of the cue-signal, resulting in servo-disturbances.

Such servo-disturbances can be avoided by preliminarily adjusting the timing of cue-signal recording electrically by means of the delaying circuit 57.

Figure 8:
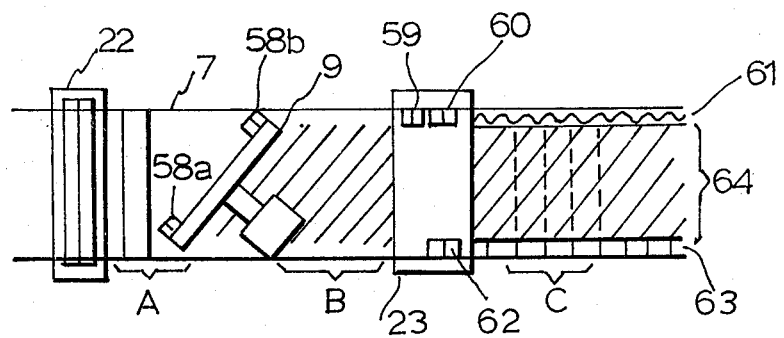
FIG. 8 is a schematic diagram illustrating the magnetization pattern of the present tape according to the invention.

In FIG. 8, there are illustrated recorded track patterns of the cue-signals, video signals, audio signals and control signals recorded by the above-mentioned apparatus. The cue-signal is first recorded by the erasing head 22 as illustrated in an area A. Then the video signals are recorded by video heads 58a and 58b (area B). Then by an audio erasing head 59 and an audio head 60 an audio signal track 61 is formed. A control signal track 63 is formed by control head 62. The audio erasing head 59, the audio head 60, and the control head 62 are disposed in the one audio and control head 23. In an area C, the video signal and track the cue-signal track overlap each other.

As mentioned above, since the audio signals are recorded after the cue-signals are erased, disturbance of the audio signals by the cue-signals does not occur. And since the control signals are recorded at the saturation level, the cue-signals are replaced with the control signal on the control track 63.

On the video track 64, the video signals are recorded on the surface layer of the tape 7 because of their high frequency, while the cue-signal is recorded in the deep layer. Therefore the cue-signals remain after recording of the video signal.

The reproduction of the video signal or the cue-signal is not disturbed by the cue-signal or the video signal because of the difference between the reproducing characteristics of the video head and the cue-signal detecting head.

If the running path of the tape 7 is accidentally shifted during reproduction, the audio head 60 picks up a part of cue-signal as noise. This is avoided by making the width of the audio erasing head 59 larger than that of the audio head 60.

What is claimed is:

1. A magnetic tape recording and reproducing apparatus comprising:
    a rotary video head assembly;
    a stationary full erase head;
    a tape transport means for transporting a magnetic tape past said rotary video head and said full erase head;
    an erasing signal source for generating erasing signals having a predetermined frequency;
    a cue-signal source for generating cue-signals having a frequency lower than said predetermined frequency of said erasing signals; and
    a switching means connected to said full erase head, said erasing signal source and said cue-signal source for selectively connecting said erasing signal or said cue-signal to said full erase head, whereby when said erasing signal is connected to said full erase head the magnetic tape is erased and when said cue-signal is connected to said full erase head a cue-signal is recorded on the magnetic tape.

2. A magnetic recording and reproducing apparatus as claimed in claim 1, further comprising:
    a control signal means for recording a control signal on a control track of the magnetic tape during the recording operation of said apparatus and for reproducing a control signal recorded on the control track of the magnetic tape during the reproducing operation of said apparatus;
    a rotary head synchronism means connected to said rotary video head assembly and said control signal means for synchronizing the rotation of said rotary video head assembly with the reproduced control signal during the reproducing operation of said apparatus; and wherein
    said cue-signal source is further connected to said control signal means for ensuring said cue-signal recorded on the magnetic tape by said full erase head is aligned in the direction of the width of the magnetic tape with the control signal recorded on the control track.

3. A magnetic recording and reproducing apparatus as claimed in claim 2, further comprising:
    a rotation signal generating means connected to said rotary video head assembly for generating a rotation pulse signal indicative of the rotation of said rotary video head assembly; and wherein
    said cue-signal source is further connected to said rotation signal generating means for generating said cue-signals in response to said rotation pulse signal.

4. A magnetic recording and reproducing apparatus as claimed in claim 2, wherein:
    said cue-signal source includes a phase adjusting means for adjusting the phase of said cue-signal.

5. A magnetic recording and reproducing apparatus as claimed in claim 1, further comprising:
    a detecting head disposed in a position for having said tape transport means transport the magnetic tape therepast, for generating a detection signal upon detection of said cue-signal recorded on the magnetic tape; and
    a controlling means connected to said tape transport means and said detecting head for controlling the recording and reproducing operation of said apparatus upon receipt of said detection signal.

6. A magnetic recording and reproducing apparatus as claimed in claim 5 wherein:
    said tape transport means comprises means for operating in two modes, a rapid transport made for rapidly moving the tape in a first tape path for transporting the magnetic tape past said detecting head and for not transporting the magnetic tape past said rotary video head assembly and said full erase head, and a recording/reproducing mode for moving the tape in a second tape path for transporting the tape past said rotary video head assembly and said full erase head for recording video signals on or reproducing video signals from the magnetic tape and for not transporting the magnetic tape past said detecting head.

* * * * *